United States Patent
Tidwell et al.

(10) Patent No.: US 6,864,895 B1
(45) Date of Patent: Mar. 8, 2005

(54) PSEUDO-LINEAR FRAME BUFFER MAPPING SYSTEM AND METHOD

(75) Inventors: Kendall F Tidwell, Fort Collins, CO (US); Courtney Goeltzenleuchter, Fort Collins, CO (US); Theodore G Rossin, Fort Collins, CO (US); Byron A Alcorn, Ft Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 643 days.

(21) Appl. No.: 09/583,201

(22) Filed: May 30, 2000

(51) Int. Cl.⁷ .............................................. G06T 1/00
(52) U.S. Cl. ....................... 345/522; 345/530; 345/544; 711/153
(58) Field of Search ................................ 345/501, 520, 345/522, 530–532, 543–544; 711/127, 153, 157, 173

(56) References Cited

U.S. PATENT DOCUMENTS

| | | | | |
|---|---|---|---|---|
| 5,038,297 A | * | 8/1991 | Hannah | 345/422 |
| 5,544,306 A | * | 8/1996 | Deering et al. | 345/545 |
| 5,924,111 A | * | 7/1999 | Huang et al. | 711/5 |
| 6,067,382 A | * | 5/2000 | Maeda | 382/239 |
| 6,170,039 B1 | * | 1/2001 | Kishida | 711/127 |
| 6,219,725 B1 | * | 4/2001 | Diehl et al. | 710/26 |
| 6,249,449 B1 | * | 6/2001 | Yoneda et al. | 365/49 |
| 6,560,686 B1 | * | 5/2003 | Nishida | 711/173 |

* cited by examiner

*Primary Examiner*—Matthew C. Bella
*Assistant Examiner*—Mackly Monestime

(57) ABSTRACT

The pseudo-linear frame buffer mapping system and method facilitates the clearing of the frame buffer memory of a graphics display system by subdividing the region of the frame buffer which is to be cleared into a plurality of sub-regions and by initiating the clear command concurrently to each of the plurality of sub-regions.

14 Claims, 6 Drawing Sheets

PSEUDO-LINEAR FRAME BUFFER MAPPING SYSTEM AND METHOD

TECHNICAL FIELD

The present invention is generally related to the field of video graphics systems and, more particularly, is related to a system and method for fast clearing of predefined regions of a frame buffer memory.

BACKGROUND OF THE INVENTION

With the advent of faster and more powerful computer processing engines, and the associated increasingly complex computer applications capable of taking advantage of these leaps in computer technology, graphic display systems are continually challenged to provide graphical information to the display screen in a fast and efficient manner. Failure to process the graphics associated with an application (program) results in slower overall performance and, often, frustration in the user who has come to expect higher levels of performance and quicker responses from each new generation of computer processor.

One aspect of providing an image to the display screen requires the updating and storage of a very large amount of data corresponding to the image displayed. This data is stored in a memory commonly referred to as the video frame buffer. Such data typically includes at least the color data for a picture element (pixel), usually defined by a combination of the three primary colors red, blue and green, and a pixel location on the display screen, such as in x-y Cartesian coordinates. Since a display screen may contain on the order of hundreds of thousands of pixels, the volume of data which is processed for a single image displayed on the display screen is huge. The speed at which the data is updated in the frame buffer is further compounded by the fact that an image is transmitted to the screen approximately 70 times per second.

Furthermore, before an image is written into the frame buffer, the entire frame buffer or portions of the frame buffer are cleared. That is, the memory unit which is to store the information for a pixel is cleared of the color information from the prior image before the pixel color information of the current image is written into the frame buffer. This way, the graphics system can ensure that the new image has been correctly stored for the new image in the frame buffer. A clear may be implemented by setting the pixel color information to a predefined color, such as black (wherein the bit information associated with pixel color is set to a predefined value, such as all zeros or all ones or some other known reference value).

FIG. 1 is a simplified illustrative figure of a video monitor 20 having a display screen 22 which displays an image 24, and the associated frame buffer memory array 26. The frame buffer memory array 26 typically resides in the frame buffer (not shown). Frame buffer memory array 26 stores pixel data 28 in a two dimensional array. As is well known in the art, pixel data has at least information associated with the color and location of each pixel which is displayed on display screen 22.

In the simplified illustration of FIG. 1, the pixel data 28 associated with the first pixel in the upper-most left-hand corner of the display screen 22, is shown to reside in the first row and first column of the frame buffer memory array 26, as indicated by arrow 30. The pixel data 28 associated with the pixel in the upper-most right-hand corner of the display screen 22 is shown to reside in the first row and last column of the frame buffer memory array 26, as indicated by arrow 32. Thus, it is seen that in this simplified illustrative example, pixel data for the first row of the display screen 22 resides in the first row of the frame buffer memory array 26. Pixel data associated with the second row of pixels of the display screen 22 would be stored in the corresponding second row of the frame memory buffer array 26, and so on for all pixels of the display screen 22. Pixel data associated with the last pixel of the display screen 22, located at the bottom right hand corner, of the display screen 24 would be stored in the corresponding Nth row, last column, of the frame memory buffer array 26.

One skilled in the art will appreciate that other video graphic systems may store pixel data 28 in a variety of manners and configurations which are quite different from the simplified illustrative example of FIG. 1, depending upon the specific architecture of the frame buffer memory and the graphics system. For example, a plurality of memory units may comprise the storage medium of the frame buffer. Or, a row of memory cells residing in the frame buffer memory array 26 may not correspond exactly to a row of pixels on the display screen 22, such that the pixel data 28 associated with one row of pixels on the display screen 22 may reside in different rows of the frame buffer memory array 26. Or, alternative technologies may store pixel data 28 in a frame buffer memory array system employing blocks that can be addressed by either Cartesian coordinates for graphics performance or by linear addressing for application convenience. Such a scheme is referred to as a "pseudo-linear" frame buffer. However, when the processor orders the transmission of image 24 to the display screen 22 in a typical rasterized video graphics display system, the pixel data 28 is assembled in a sequential order starting with the first pixel in the upper-most left-hand corner of the display screen 22 and ending with the last pixel located at the bottom right hand corner of the display screen 22.

Similarly, the video graphics system application which writes data into the frame buffer memory array 26 may write pixel data into the frame buffer in a sequential manner. Depending upon the specific architecture of the video graphics system, data writing to the frame buffer memory array 26 may be implemented sequentially through the entire sequence of pixels, as in the simplified system of FIG. 1, or portions of the pixel data 28 may be written concurrently to a plurality of memory arrays by a group of parallel video processors. However, even with a parallel video graphics processor system, those portions of the pixel data 28 written to any particular memory array occurs in a sequential manner or in some other type of ordered manner. The large number of individual pixels which comprise a video image 24 is so great that processing systems in use today can not physically process all pixel information simultaneously. Some degree of sequential processing of pixel data is required.

FIG. 2 is a simplified illustrative figure of a display screen 22 of FIG. 1 with a window 42 written over the top of a portion of image 24. Window 42 is shown as a region of the display screen 22 drawn by solid vertical lines. Typically, such a window 42 represents a graphical output from a second application which is running concurrently with the application which created image 24. The computer user may be interacting with this second application in a manner which only requires a portion of the display screen 22, as is well known in the art.

During execution of the second application, the second application may generate the window 42 for viewing on the display screen 22. Typically, the window 42 would then be overwritten onto the top of image 24. Pixel data associated with window 42 is determined by the processor (not shown) executing the second application and then the pixel data is written into the frame buffer memory array 26 (FIG. 1) in a region of the frame buffer memory array 26 defined, in part, by the location of the window 42 on display screen 22. However, prior to writing the pixel data 28 associated with window 42 into the region of the frame buffer memory array 26, the region to which the pixel data 28 is to be written is first cleared. Because of the sequential processing of pixel data 28, the required clear of the region of the frame buffer memory array 26 associated with window 42 may require a substantial amount of time (relative to the time frame that the video graphic system is operating on).

The substantial time period required for the clearing of pixel data 28 (FIG. 1) associated with window 42 may result in a slow-down in the overall performance of the video graphic system and an associated slow-down in the performance of all application programs running on the computer system. Prior art systems have taken a variety of approaches in an effort to speed up the process of clearing. One basic approach is to utilize a plurality of specially designed memory units for block writes. A non-limiting example of one such type of memory is the Sychronous Graphics Random Access Memory (SGRAM). However, the use of SGRAM to speed up the clear process has the disadvantage of increased cost and the low-availability of SGRAM memory parts from parts suppliers.

Other methods of improving the clearing process utilities algorithms designed to avoid actually updating all of the memory associated with each individual pixel that is to be cleared. These special algorithms rely on specialized hardware and/or specialized software to hide the fact that the contents of a frame buffer do not match exactly what is displayed on the screen. Hence, these special algorithm methods require a certain degree of complexity to implement. Also, the specialized algorithms often have undesirable visual artifacts under certain "corner case" conditions, as is well known in the art. Therefore, these specialized fast clear algorithms have the disadvantage of requiring special hardware to execute the very complex algorithms and the disadvantage of the corner case problems associated with the undesirable visual artifacts.

Another method for improving clearing employs special memory configurations having a clear bit and a separate color register. These special memory configurations employ a single bit per pixel to indicate a clear condition to avoid writing all the bits that represent a pixel in the frame buffer 62 (FIG. 3). If the clear bit for a pixel is set, the color in the separate color register is transmitted to the display screen 20 in place of the contents of the frame buffer 62.

Because of the importance associated with the speed of a video graphics system, a heretofore unaddressed need exists in the industry for a way to better address the aforementioned deficiencies and inadequacies in clearing pixel data.

SUMMARY OF THE INVENTION

The present invention provides a pseudo-linear frame buffer mapping system and method. The system and method facilitate the clearing of the frame buffer memory of a graphics display system by subdividing the region of the frame buffer which is to be cleared into a plurality of sub-regions and by initiating the clear command which concurrently clears each of the plurality of sub-regions.

In architecture, a pseudo-linear frame buffer mapping system utilizes a processor, a memory, a frame buffer memory controller, a frame buffer and pseudo-linear frame buffer control logic (residing in the memory). The processor determines the need to clear a region of memory of the frame buffer and then executes the pseudo-linear frame buffer control logic which divides the region to be cleared into a plurality of sub-regions and identifies the location of each of the sub-regions. The processor then issues a clear command to the frame buffer memory controller, and the frame buffer memory controller clears of each of the sub-regions concurrently.

The pseudo-linear frame buffer mapping system of the present invention can also be viewed as providing a method (s) for writing clear data residing in a frame buffer for a graphic display device. In this regard, an example of one such method can be broadly summarized by the following steps: determining a dimension and a position of at least one image displayed on a graphics display device where pixel data associated with the image is to be cleared; determining a location of a region of memory in the frame buffer where the pixel data is stored; subdividing the region into a plurality of sub-regions; writing clear data concurrently to each of the sub-regions. Additionally, the method may include the step of associating a plurality of location identifiers, or pointers, such that one location identifier is associated with each one of the sub-regions, and where the step of concurrently writing clear data begins at each of the sub-regions at the location identified by corresponding location identifiers. Furthermore, an alternative embodiment may include the step of determining the dimension and position of a plurality of images, and repeating the steps of determining a location and subdividing for each one of the plurality of images.

Other systems, methods, features, and advantages of the present invention will be or become apparent to one with skill in the art upon examination of the following drawings and detailed descriptions. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

The pseudo-linear frame buffer mapping system of the present invention can be implemented in hardware, software, firmware, or a combination thereof. In the preferred embodiment, the pseudo-linear frame buffer mapping system is implemented in hardware with software control instructions that are stored in a memory and that are executed by a suitable instruction execution system. If implemented solely in hardware, as in an alternative embodiment, the pseudo-linear frame buffer mapping system can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Figure 2:
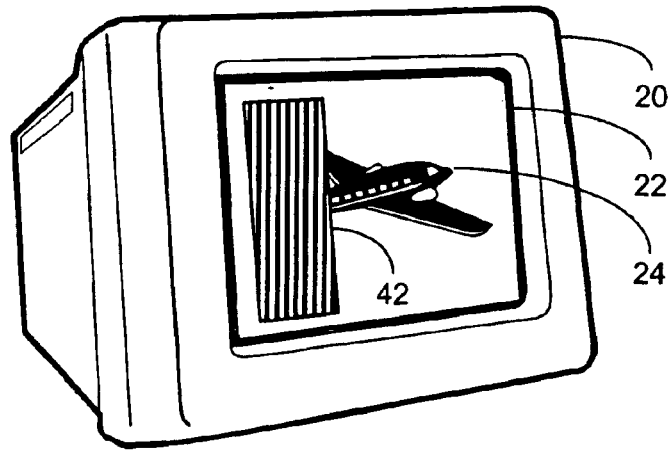
FIG. 2 illustrates the image of FIG. 1 partially covered by a window generated by a second application which is running concurrently with an application which has generated the image of FIG. 1.
Figure 3:
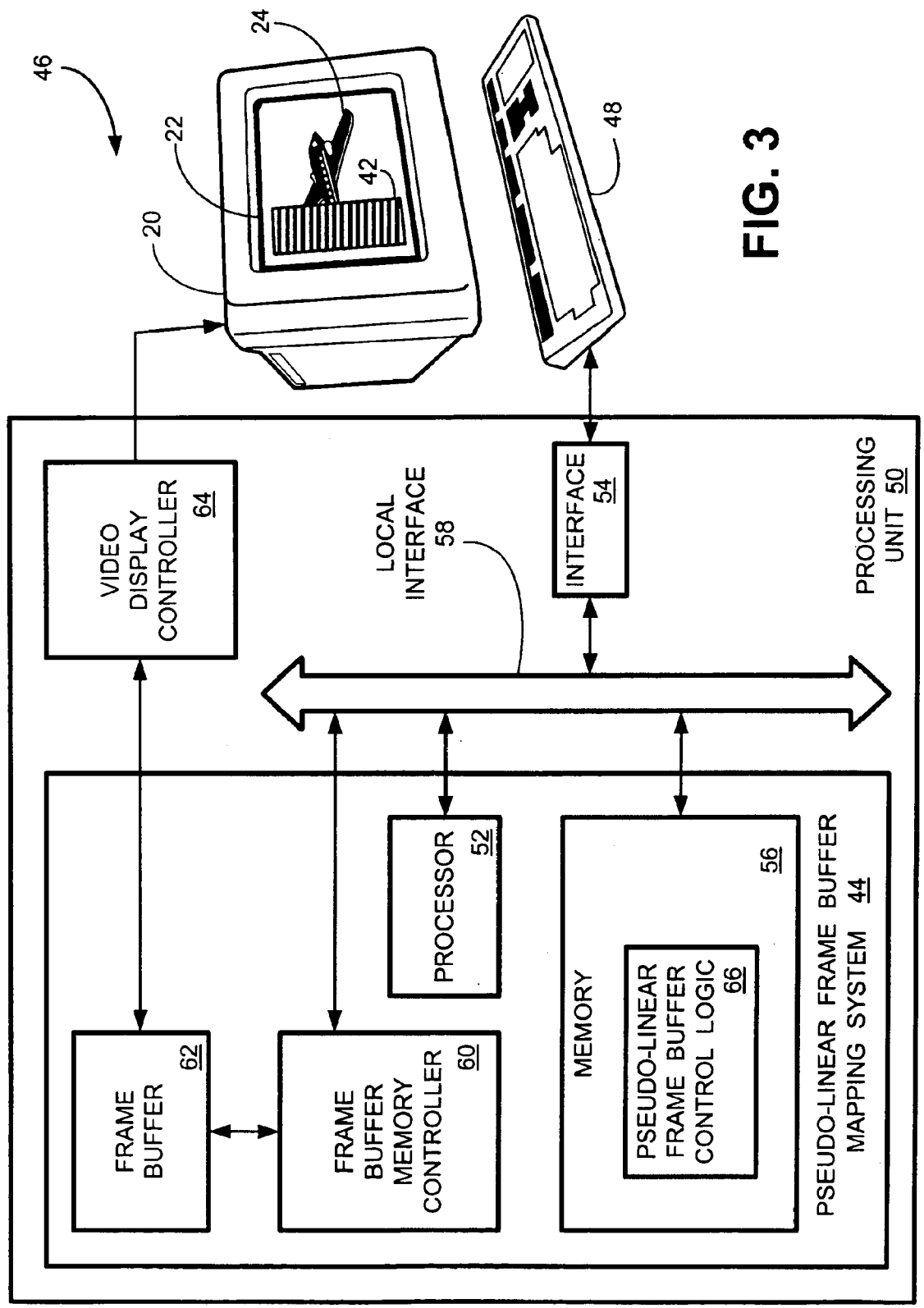
FIG. 3 illustrates a computer system wherein the pseudo-linear frame buffer mapping system of the invention resides.

FIG. 3 is a simplified illustrative example of a system wherein a preferred embodiment of the pseudo-linear frame buffer mapping system 44 may reside. Elements in FIG. 3 that are similar to those in FIGS. 1 and 2 bear the same reference numerals. Such elements having the same reference numerals in FIGS. 1, 2 and 3 may be considered to be like elements. However, since these like numerated elements are incidental to the operation of the pseudo-linear frame buffer mapping system 44 which utilizes existing portions of a graphics video display system, one skilled in the art will realize that the elements in FIGS. 1, 2 and 3 need not be identical, as any variations of such elements will not adversely affect the functioning and performance of the pseudo-linear frame buffer mapping system 44. Therefore, identical elements which are like-numbered will not be described again in detail.

The system illustrated in FIG. 3 is a video display device, such as, but not limited to, a personal computer (PC) system 46. PC system 46 contains at least a video monitor 20, a keyboard 48 and a processing unit 50. As is well known in the art, PC system 46 typically contains many individual components aggregated together in a manner that performs the multitude of tasks associated with PC system 46, however, these other associated elements are not relevant to an explanation of the pseudo-linear frame buffer mapping system 44 and are not shown in FIG. 3. Only those components relevant to the functioning of the pseudo-linear frame buffer mapping system 44 are shown in FIG. 3 and described herein. Any such alternative embodiments of PC system 46 or other processing systems which employ a pseudo-linear frame buffer mapping system 44 are intended to be within the scope of this disclosure and be protected by the accompanying claims for the pseudo-linear frame buffer mapping system 44.

Processing unit 50 contains a plurality of components which are relevant to the generation of the image 24 and the window 42 which are displayed on the display screen 22. In the simplified illustrative example of FIG. 1, processing unit 50 has at least the following components: a processor 52, an interface 54, a memory 56, a local interface bus 58, a frame buffer memory controller 60, a frame buffer 62 and a video display controller 64. The pseudo-linear frame buffer mapping system 44 utilizes the processor 52, memory 56, frame buffer memory controller 60 and frame buffer 62. The pseudo-linear frame buffer control logic 66 resides in memory 56.

Frame buffer 62 is a memory device where data associated with at least the color and location of a plurality of pixels is written to and read from. The pseudo-linear frame buffer control logic 66, when executed by processor 52, provides information so that processor 52 may provide the instructions to frame buffer memory controller 60 so that sub-regions of the memory of frame buffer 62 may be cleared in a manner described hereinafter.

Processor 52 is commonly known as a central processing unit (CPU) commonly employed in the computing arts. The PC system 46 shown in FIG. 3 contains only one processor 52, however other processor systems may have a plurality of processors 52 which may work either alone or in cooperation with the other processors. Any such alternative embodiments of multi-processor PC systems which employ a pseudo-linear frame buffer mapping system 44 are intended to be within the scope of this disclosure and be protected by the accompanying claims for the pseudo-linear frame buffer mapping system 44.

The computer user (not shown) interfaces with the PC system 46 through keyboard 48. Interface 54 provides the interface between commands entered by the user from the keyboard 48 which are processed by processor 52. Instructions to other components residing in processing unit 50 that are issued by processor 52 are communicated over local interface bus 58. Processor 52 may store and/or retrieve information on the memory 56. The frame buffer memory controller 60 receives instructions from processor 52 and data from the memory 56 over the local interface bus 58. The processor 52, interface 54, memory 56, local interface bus 58, frame buffer 62 are well known components of a processing unit 50. Detailed operation of these individual components are not described in detail herein other than to the extent necessary to understand the operation and functioning of these components when employed as part of the pseudo-linear frame buffer mapping system 44. One skilled in the art will realize that a PC system 46 or other processor systems employing the pseudo-linear frame buffer mapping system 44 may have the components shown in FIG. 3 connected in a different order and manner than shown in FIG. 6, or may not include all of the components shown in FIG. 3, or may include additional components connected in some manner with the components shown in FIG. 3. Any such variations in a PC system 46 or a processor system which utilizes the pseudo-linear frame buffer mapping system 44 are intended to be within the scope of this disclosure and be protected by the accompanying claims for the pseudo-linear frame buffer mapping system 44.

The video display controller 64 extracts pixel information from the frame buffer 62, processes the pixel information into the appropriate format utilized by the video monitor 20 and transmits the pixel information associated with image 24 and window 42 to display screen 22. One skilled in the art will appreciate that FIG. 3 merely illustrates a simplified example of one implementation of frame buffer 60 and the video display controller 64. In other embodiments of a processing unit 50, video display controller 64 and frame buffer memory controller 60 may be implemented together as a single component which performs the functions of the frame buffer memory controller 60 and the video display controller 64 of FIG. 3. Any such alternative embodiments are intended to be within the scope of this disclosure.

Pixel information which is used to create the view shown on display screen 22 is prepared by processor 52 and is transmitted to the frame buffer memory controller 60. This pixel information is formatted by frame buffer memory controller 60 and then stored in frame buffer 62. When all of the pixel information associated with a single screen image has been written to (stored in) frame buffer 62, video display controller 64 may then take the stored pixel information and transmit the pixel information to video monitor for display.

Figure 1:
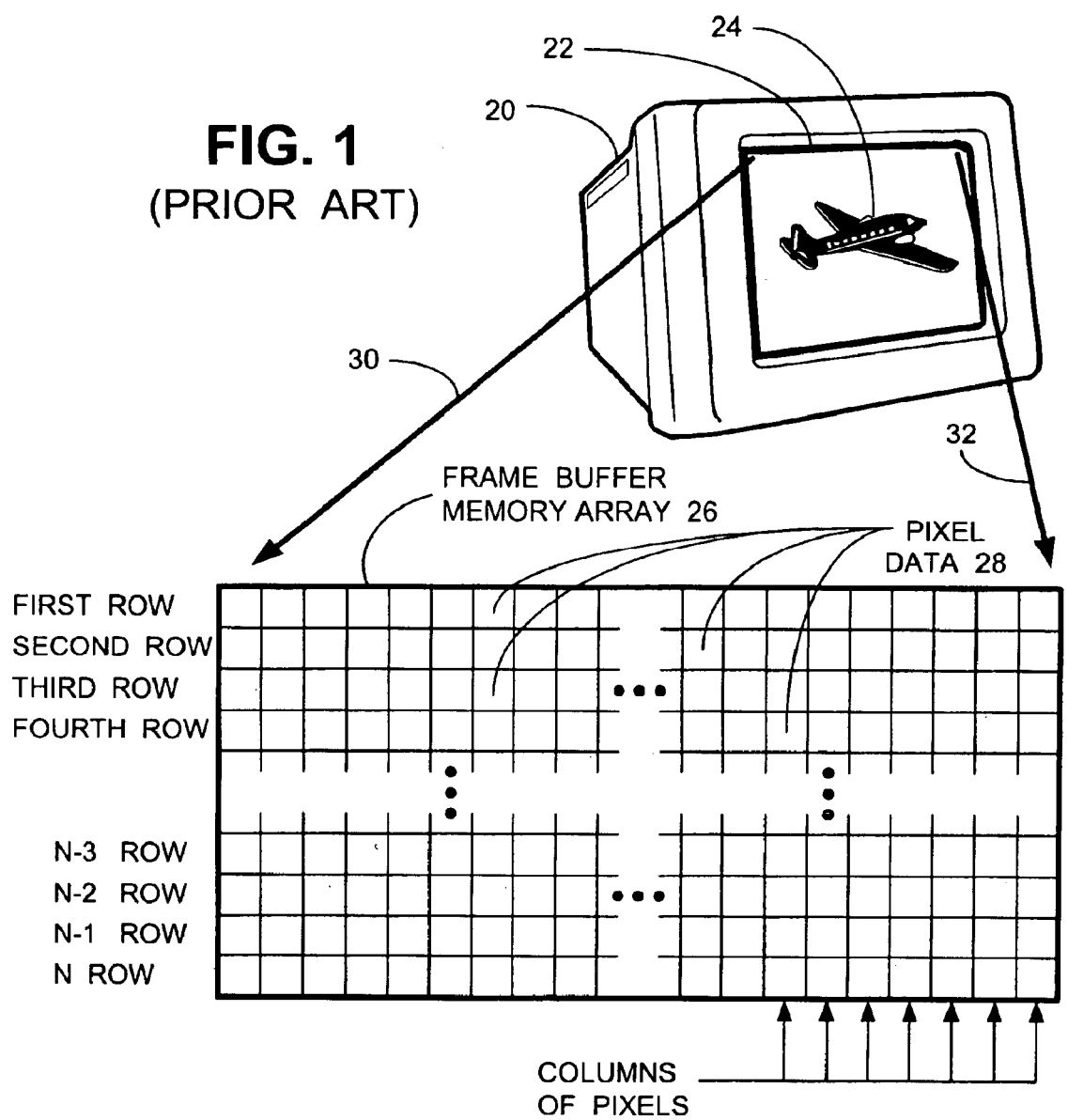
FIG. 1 illustrates portions of a prior art video graphics system having a frame buffer memory array and image.
Figure 4:
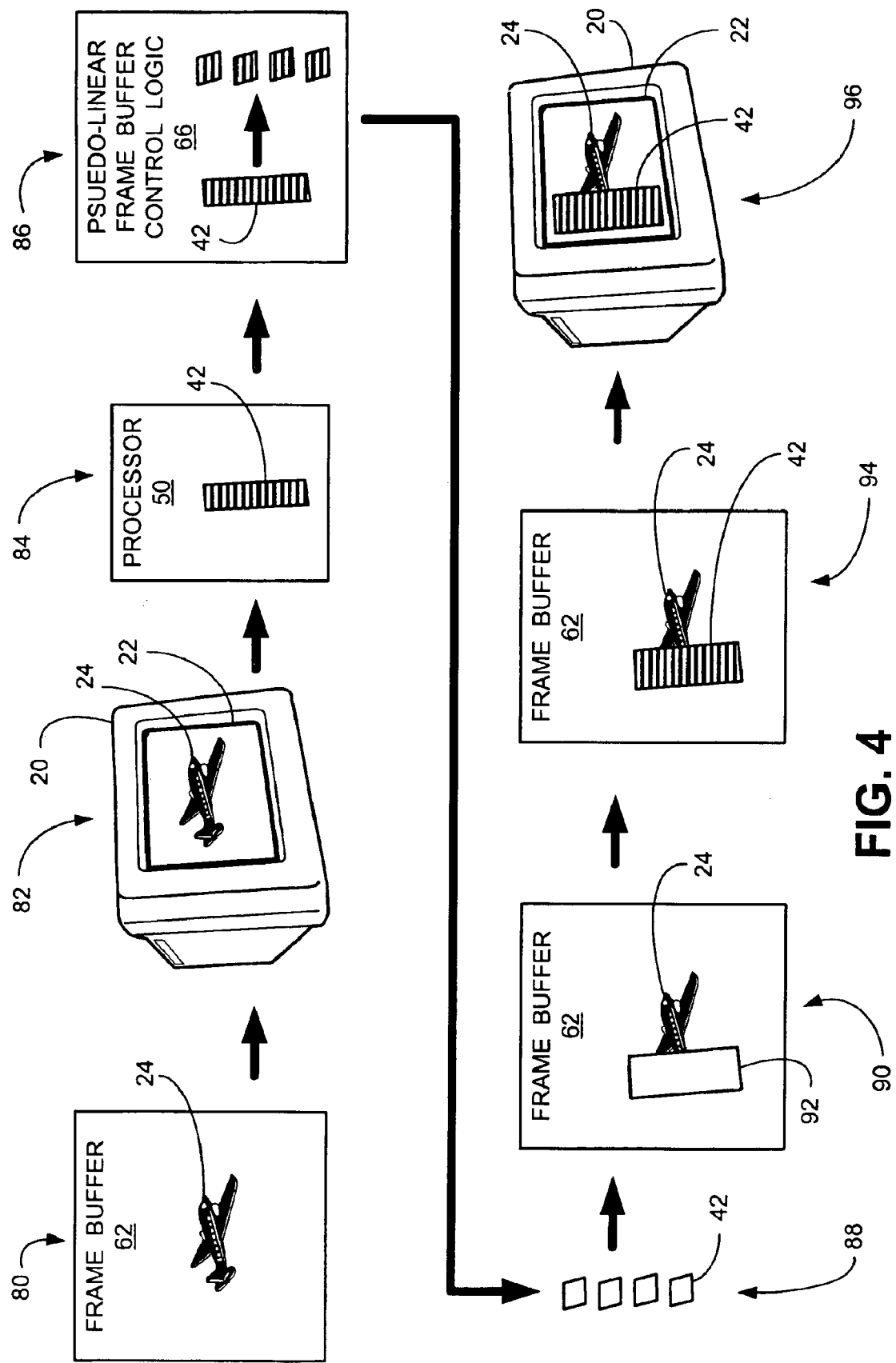
FIG. 4 illustrates the sequence of writing the image of FIG. 1 onto a screen and the subsequent process of overwriting a window into the frame buffer memory and then onto the screen as shown by the image of FIG. 2.

FIG. 4 is a simplified illustrative figure showing a sequence of events wherein the image 24 shown on video monitor 20 of FIG. 1 is overwritten with the window 42 as shown in FIGS. 2 and 3. The sequence of events shown in FIG. 4 provides a simplified illustrative overview of one possible process by which the preferred embodiment of the pseudo-linear frame buffer control logic 66 (see also FIG. 3) interacts with the processor 52, frame buffer memory controller 60 and the frame buffer 62 to perform the clearing function. The sequence of events begins at step 80 which illustrates that pixel information associated with image 24 has been written to and stored in frame buffer 62 (see also FIG. 3). In the next step 82, the pixel information is shown to be transmitted to the video monitor 20 for displaying on display screen 22 (see also FIG. 1). Next, the processor 52, during execution of the second application, determines that window 42 is to be displayed on the video monitor 20. Processor 52 then prepares the associated pixel information to display window 42, as illustrated at step 84. Then, at step 86, the pixel information associated with window 42 is further processed by executing the pseudo-linear frame buffer control logic 66. The pseudo-linear frame buffer control logic 66 analyzes window 42 to determine the location of a region residing in the frame buffer 62 where pixel information associated with window 42 is to be written. The preferred embodiment of the pseudo-linear frame buffer control logic 66 then divides the identified region into four sub-regions as illustrated by step 86. The frame buffer controller 60 is then programmed with data for the four sub-regions. A clear command is then issued to the frame buffer memory controller 60 which initiates a simultaneous (concurrent) clear of the four sub-regions, as illustrated by the four white sub-regions shown in step 88 which represents pixel information corresponding to the clear condition. A clear command results in the writing of the pixel information associated with a clear condition into frame buffer 62 for the entire window 42, as shown by step 90. The cleared region 92 corresponds to the region within the frame buffer 62 that has been cleared in anticipation of receiving the pixel information associated with window 42. After clearing, the frame buffer memory controller 60 (FIG. 3) then writes the pixel information associated with window 42 into frame buffer 62, as illustrated by step 94. Finally, at step 96, the contents of the frame buffer 62, which now has pixel information associated with the combination of image 24 and window 42, is transmitted to video monitor 20 for view on display screen 22 (see also FIGS. 2 and 3).

As noted in the background section, the clearing methods employed by the prior art systems may require a substantial amount of time to implement. The pseudo-linear frame buffer mapping system 44 (FIG. 3) speeds up the process, as illustrated in FIG. 4, by analyzing the pixel information associated with window 42 and by dividing up the region which is to be cleared within frame buffer 62 into sub-regions so that individual sub-regions may be concurrently (simultaneously) cleared thereby facilitating the clearing process.

Figure 5:
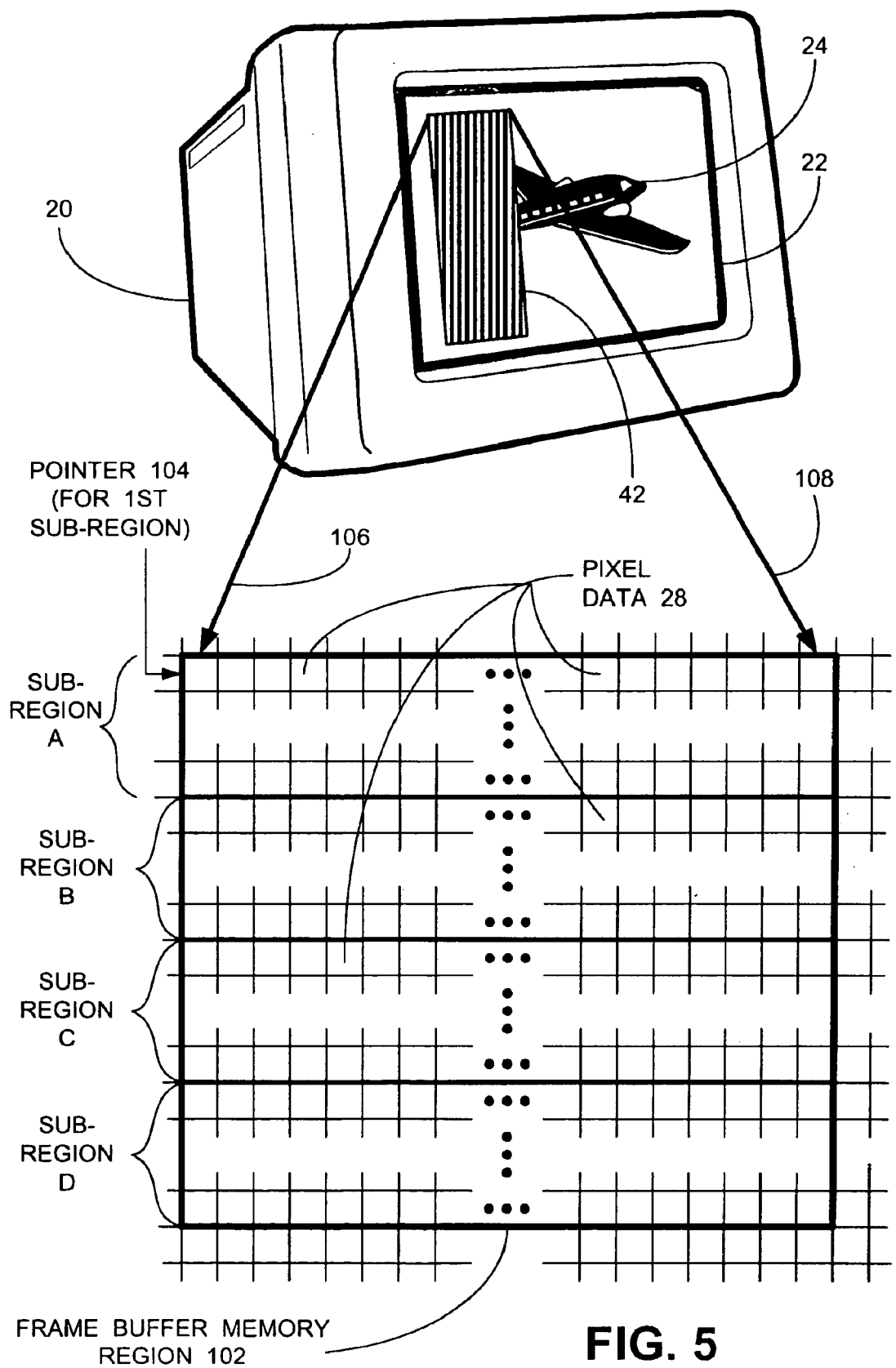
FIG. 5 illustrates a plurality of sub-regions defined by the pseudo-linear frame buffer mapping system in the frame buffer memory array shown in FIG. 1 corresponding to pixel data associated with the window of FIG. 2.

FIG. 5 is a simplified illustrative example of a video monitor 20 and display screen 22 which displays image 24 overwritten by the window 42, and the associated frame buffer memory region 102 which is associated with the pixel information for window 42. The frame buffer memory region 102 is seen to be divided into four sub-regions, A–D, by the preferred embodiment of the pseudo-linear frame buffer mapping system. Each sub-region has an associated location identifier or pointer which resides in a register such that when the clear command is issued (see steps 88 and 90 of FIG. 4), the frame buffer memory controller 60 (FIG. 3) can issue concurrent clears to the plurality of sub-regions. As illustrated in FIG. 5, pointer 104 identifies the starting location of the pixel information associated with window 42 that has been subdivided into sub-region A of the frame buffer memory array portion 102. Similarly, sub-regions B–D have associated pointers (not shown) which identify the starting location of their respective location in frame buffer memory array portion 102.

In the preferred embodiment, and as shown in the simplified illustrative example of FIG. 3, the pixel information associated with the first pixel of image 42, located at the top left-hand corner of window 42, is shown to be assigned to sub-region A as denoted by arrow 106. Similarly, the pixel information associated with the upper-most right-hand corner of window 42 is shown to reside in the location of sub-region A by the arrow 108. Thus, the entire top row of pixels for window 42 is shown to be assigned to the top row of sub-region A in the simplified illustrative example shown in FIG. 5. When the clear command issues from processor 52, frame buffer memory controller 60 (FIG. 3) can order clearing of sub-region A, identified by pointer 104, and clear the first pixel associated with window 42, as shown by arrow 108. Then the clearing process continues the clear to the remaining memory units of sub-region A in a quick and efficient manner. In the preferred embodiment, the processor 52 issues a clear command and frame buffer memory controller 60 clears sub-regions B–D concurrently with sub-region A. Thus, in the preferred embodiment illustrated by FIG. 5, the clear command is seen to be implemented in at least one quarter of the time that prior art systems effect the clear for window 42. Also, because the pseudo-linear frame buffer mapping system 44 (FIG. 3) is clearing only those portions associated with pixel information for window 42 and not having to spend time searching through all memory units of the frame buffer memory array 26 (FIG. 1), the pseudo-linear frame buffer mapping system 44 (FIG. 3) may complete the clearing process substantially faster and more efficient than some prior art clearing methods or systems which search the entire frame buffer memory array 26 (FIG. 1) during the clear process.

As described hereinabove, the clearing process is described as being initiated by the processor 52 which issues a single clear command to frame buffer memory controller 60, which then concurrently clears each of the sub-regions. One skilled in the art will realize that the clears may be implemented in parallel.

Also, some microprocessor systems operates in a sequential nature (operations are implemented by a sequential series of instructions executed by the processor). Clears employing a pseudo-linear frame buffer mapping system 44 (FIG. 3) would be effected in series such that the clears would be done in a substantially concurrent manner. Such a processing system employing a serial clearing approach operates so quickly, relative to the viewpoint of the user, that the clearing function would appear to be executed concurrently.

In the preferred embodiment, sub-regions A–D are equal in array dimension as shown in the simplified illustrative example of FIG. 5. That is, sub-region A is defined by the pseudo-linear frame buffer mapping system 44 (FIG. 3) to be as wide as necessary to correspond with window 42 and to be exactly one-quarter of the depth of window 42. (Alternative embodiments of a pseudo-linear frame buffer mapping system 44 would define the plurality of sub-regions based upon the region of frame buffer 62 (FIG. 4) which is associated with window 42.) The other three sub-regions, B–D, correspond to the other quantities of the pixel information associated with window 42. However, it may be that there are unaligned bottom portions of pixel information which cannot be associated with a sub-region because, in the preferred embodiment, the sub-regions are all of equal depth.

Figure 6:
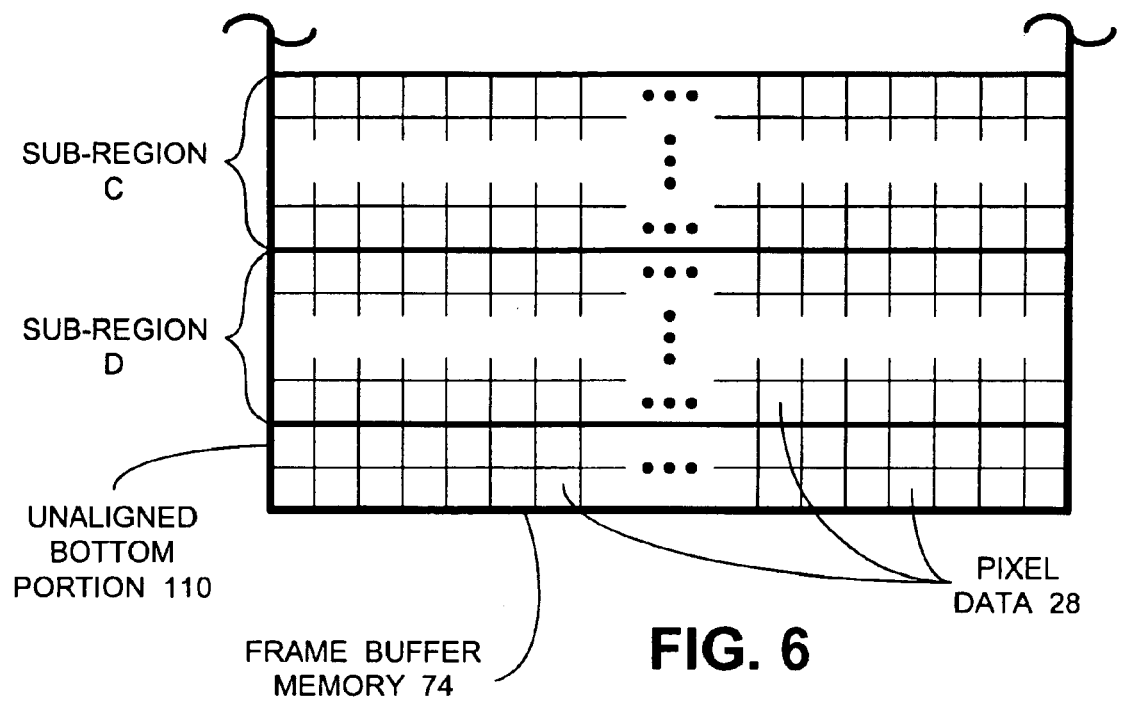
FIG. 6 illustrates two of the sub-regions of FIG. 4 and an unaligned bottom portion of data which is to be cleared yet is not assigned to a sub-region of the pseudo-linear frame buffer mapping system.

FIG. 6 is a simplified illustrative diagram showing the unaligned bottom portion 110 of pixel information associated with window 42 (FIG. 5) which has not been assigned to any of the sub-regions, A–D. This unaligned bottom portion 110 residing in frame buffer 62 (FIG. 4) is cleared in a normal manner. That is, the pixel information residing in the unaligned bottom portion 110 is cleared using the prior art clearing methods. Furthermore, regions of pixel information associated with window 42 (FIG. 5) which have not been included within the sub-regions, such as at the sides or the tops of the region, would also be cleared using the prior art clearing methods. Thus, the pseudo-linear frame buffer mapping system 44 (FIG. 3) is seen to be able to analyze a region of a frame buffer 62 (FIG. 3) which is to be cleared, identify a plurality of sub-regions such that the sub-regions cover as great a portion as possible of the region to be cleared.

Alternative embodiments of the pseudo-linear frame buffer mapping system may provide for two or more sub-regions. Also, alternative embodiments of the pseudo-linear frame buffer mapping system may provide for sub-regions having different lengths and/or different depths. These alternative embodiments could eliminate or reduce the amount of pixel information residing in any unaligned bottom portion 110.

Figure 7:
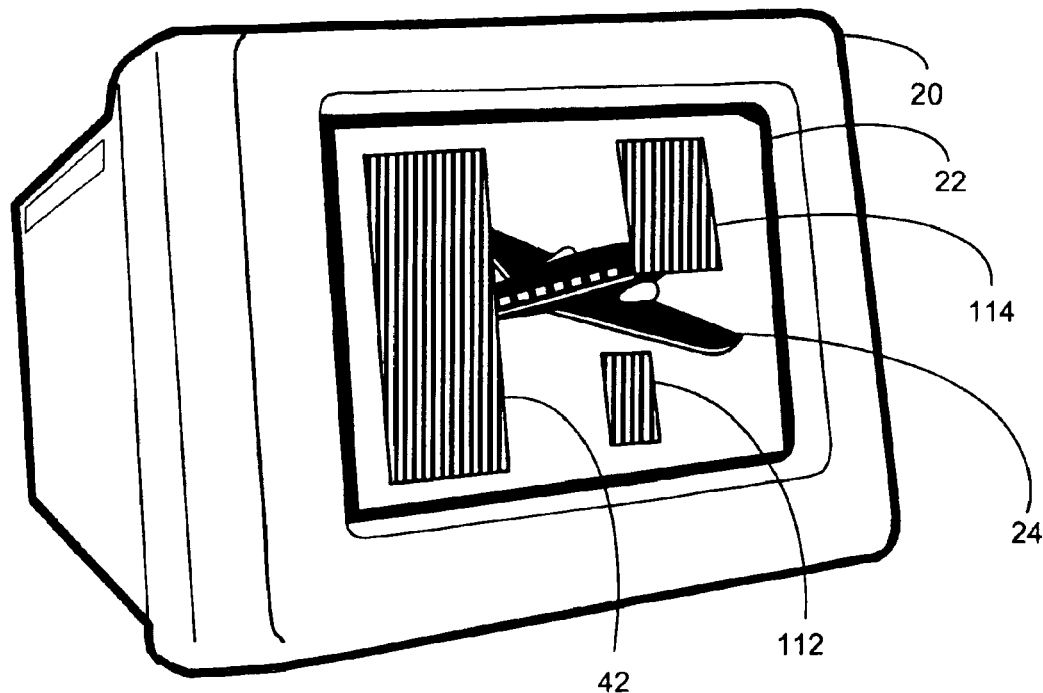
FIG. 7 illustrates the image of FIG. 1 partially covered by three windows generated by a second application.

Additionally, an alternative embodiment of the pseudo-linear frame buffer mapping system 44 (FIG. 3) may provide for a plurality of sub-regions which may be assigned to a plurality of window regions, as illustrated in FIG. 7. In FIG. 7, in addition to the window 42, two other windows, 112 and 114, are seen to be displayed on the video monitor 20 (FIGS. 1–3). Here, in the illustrative example shown in FIG. 7, a plurality of sub-regions would be associated with each one of the plurality of windows 42, 112 and 114. Clear commands for the plurality of windows would be issued and plurality of sub-regions would be cleared concurrently.

Another alternative embodiment of the pseudo-linear frame buffer mapping system 44 (FIG. 3), processor 52 may issue a plurality of clear commands, each one of the clear commands being associated with one of the plurality of sub-regions associated with the window to be cleared. The plurality of clear commands associated with this alternative embodiment would be issued concurrently, in parallel, or in series so as to be substantially concurrently, by processor 52 (FIG. 3).

Figure 8:
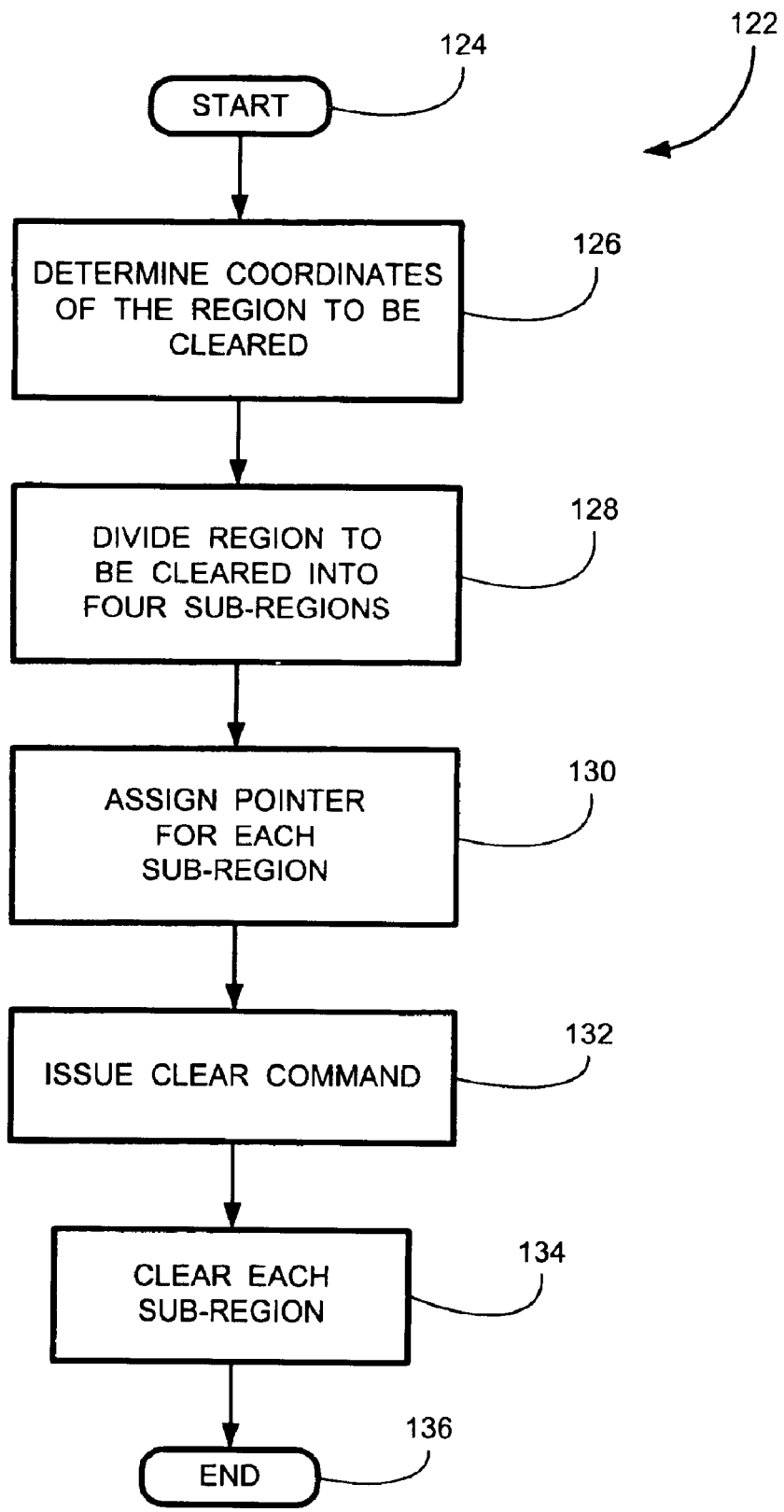
FIG. 8 is a flow chart showing a method of dividing a portion of a frame buffer memory into a plurality of sub-regions with the pseudo-linear frame buffer mapping system of FIG. 3.

FIG. 8 is a flow chart 122 illustrating the architecture, functionality and operation of a possible implementation of the pseudo-linear frame buffer mapping system logic 63 (FIG. 3). In this regard, each block may represent a module, segment or portion of code, which comprises one or more executable instructions for implementing the specified logical function(s). It should also be noted that in some alternative implementations, the functions noted in the blocks may occur out of the order noted in FIG. 8 or may include additional functions without departing significantly from the functionality of the pseudo linear frame buffer mapping system 44 (FIG. 3). For example, two blocks shown in succession in FIG. 8 may in fact be executed substantially concurrently, the blocks may sometimes be executed in the reverse order, or some of the blocks may not be executed in all instances, depending on the functionality involved, as will be further clarified hereinbelow.

The clearing process as implemented by a pseudo-linear frame buffer mapping system 44 (FIG. 3) as illustrated by the flow chart 122 of FIG. 8 begins at block 124. The pseudo-linear frame buffer mapping logic 66 (FIG. 3) first determines coordinates of the region to be cleared as indicated by block 126. At block 128, the preferred embodiment of the pseudo-linear frame buffer mapping logic 66 divides the region to be cleared into four sub-regions. Then, at block 130, the pseudo-linear frame buffer mapping logic 66 assigns a pointer for each of the four sub-regions. This pointer is stored in a register in the frame buffer memory controller 60 (not shown). At block 132, a clear command is issued and at block 134 each of the sub-regions are cleared. The process ends at block 136. After clearing, the cleared sub-regions will now be ready to accept writing of pixel information associated with window 42 (FIGS. 2–6).

A program which implements the pseudo-linear frame buffer control logic 66 (FIG. 3), which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The use of window 42 (FIGS. 2–6), or a plurality of windows (FIG. 7), was used as a matter of convenience for providing a simplified means to explain the functionality of a pseudo-linear frame buffer mapping system 44 (FIG. 3). The pseudo-linear frame buffer mapping system 44, in alternative embodiments, may be designed to operate on any shape or form of image which is to be written to the frame buffer 62 (FIG. 3). That is, this disclosure of the pseudo-linear frame buffer mapping system 44 is not intended to be limited by the rectangular nature of typical windows commonly employed in various program applications.

Furthermore, it should be emphasized that the above-described embodiments of the pseudo-linear frame buffer mapping system 44 (FIG. 3), particularly, any "preferred" embodiments or configurations, are merely possible examples of implementations, merely set forth for a clear understanding of the principles of the pseudo-linear frame buffer mapping system 44. Many variations and modifications may be made to the above-described embodiment(s) of the pseudo-linear frame buffer mapping system 44 without departing substantially from the spirit and principles of the pseudo-linear frame buffer mapping system 44. All such modifications and variations are intended to be included herein within the scope of this disclosure and protected by the following claims.

What is claimed:

1. A method for writing clear data to a frame buffer of a graphics display device, comprising:
    determining a dimension and a position of at least one image displayed on said graphics display device, wherein said at least one image is to be cleared;
    determining a location of a region of memory where a plurality of data having at least pixel information associated with a plurality of pixels which display said at least one image is stored;
    subdividing said memory region into a plurality of sub-regions; and
    writing said clear data concurrently to each of said plurality of sub-regions.

2. The method of claim 1, further comprising issuing one clear command which initiates said writing said clear data concurrently.

3. The method of claim 1, further comprising issuing a plurality of clear commands, wherein each one of said clear commands corresponds to one of each said plurality of sub-regions, and wherein the issuing said plurality of clear commands initiates said writing said clear data concurrently.

4. The method of claim 1, further comprising associating a plurality of location identifiers, wherein one location identifier is associated with each one of said plurality of sub-regions residing in said frame buffer, and wherein said concurrently writing clear data begins at said plurality of sub-regions identified by said plurality of corresponding location identifiers.

5. The method of claim 1, further comprising determining said dimension and said position for each one of a plurality of images, and repeating the determining a location and the subdividing for each one of said plurality of images.

6. A computer-readable medium having a program for clearing data residing in a memory region, the program comprising logic configured to:
    determine a dimension and a position of at least one image displayed on a video display device, wherein said at least one image is to be cleared;
    determine a location of said memory region where a plurality of data having at least pixel information associated with a plurality of pixels which display said at least one image is stored;
    subdivide said memory region into a plurality of sub-regions; and
    write said clear data concurrently to each of said plurality of sub-regions.

7. A system for clearing data residing in a memory region, comprising:
    means for determining a dimension and a position of at least one image displayed on said graphics display device, wherein said at least one image is to be cleared;
    means for determining a location of a region of memory where a plurality of data having at least pixel information associated with a plurality of pixels which display said at least one image is stored;
    means for subdividing said memory region into a plurality of sub-regions; and
    means for writing said clear data concurrently to each of said plurality of sub-regions.

8. The system of claim 7, further comprising means for associating a plurality of location identifiers, wherein one location identifier is associated with each one of said plurality of sub-regions residing in said frame buffer, and wherein said means for concurrently writing clear data begins at said plurality of sub-regions identified by said plurality of corresponding location identifiers.

9. The system of claim 8, further comprising means for determining said dimension and said position for each one of a plurality of images, and wherein said means of determining a location and said means for subdividing said memory region operates on each one of said plurality of images.

10. A graphics system comprising:
    a frame buffer; and
    a pseudo-linear frame buffer control logic for clearing data in the frame buffer, the pseudo-linear frame buffer control logic configured to:
        determine a region of the frame buffer to be cleared;
        subdivide the region of the frame buffer into a plurality of sub-regions; and
        concurrently write clear data to each of the plurality of sub-regions.

11. The graphics system of claim 10, wherein the pseudo-linear frame buffer control logic is configured to subdivide the region of the frame buffer to be cleared into consecutive and adjacent sub-regions.

12. The graphics system of claim 10, wherein the pseudo-linear frame buffer control logic is configured to subdivide the region of the frame buffer to be cleared into sub-regions that vary in dimension.

13. The graphics system of claim 10, wherein the clear data written to each of the plurality of sub-regions corresponds to a predefined color of a pixel.

14. The graphics system of claim 10, wherein the pseudo-linear flame buffer control logic is further configured to:
    determine a dimension and a position of at least one image displayed on a video display device which is to be cleared; and
    determine a location of the at least one image in the region of the frame buffer.

* * * * *

UNITED STATES PATENT AND TRADEMARK OFFICE
CERTIFICATE OF CORRECTION

PATENT NO.         : 6,864,895 B1
APPLICATION NO. : 09/583201
DATED              : March 8, 2005
INVENTOR(S)        : Kendall F. Tidwell et al.

It is certified that error appears in the above-identified patent and that said Letters Patent is hereby corrected as shown below:

IN THE CLAIMS

Claim 14, Column 12, line 55, delete "flame" and insert therefor --frame--

Signed and Sealed this

Twenty-eighth Day of August, 2007

JON W. DUDAS
*Director of the United States Patent and Trademark Office*